C. W. KENNEDY.
FOUR-WHEEL DRIVE FOR AUTOMOBILES.
APPLICATION FILED DEC. 19, 1916.
1,229,971. Patented June 12, 1917.
3 SHEETS—SHEET 2.
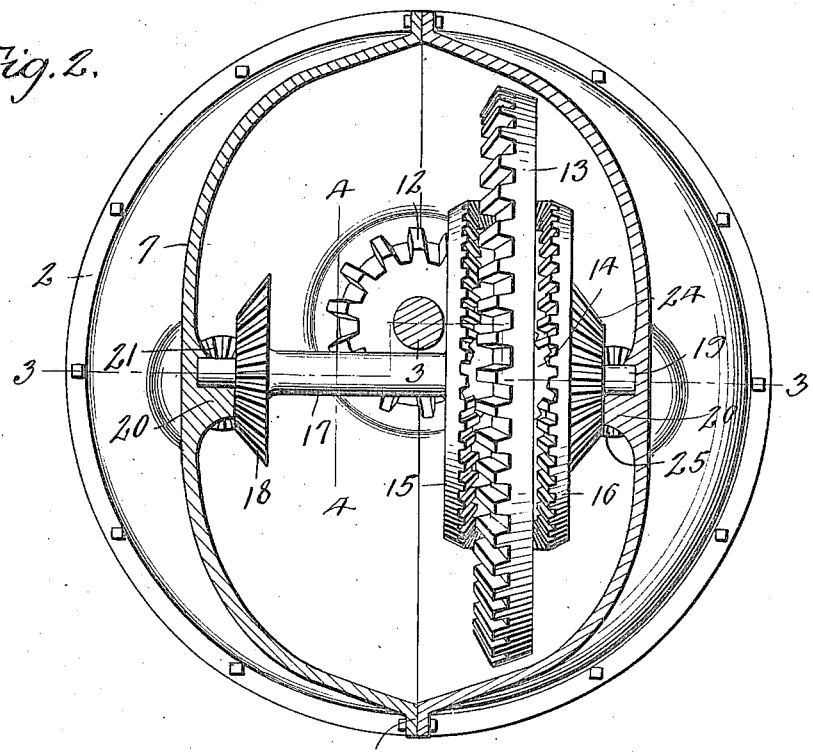
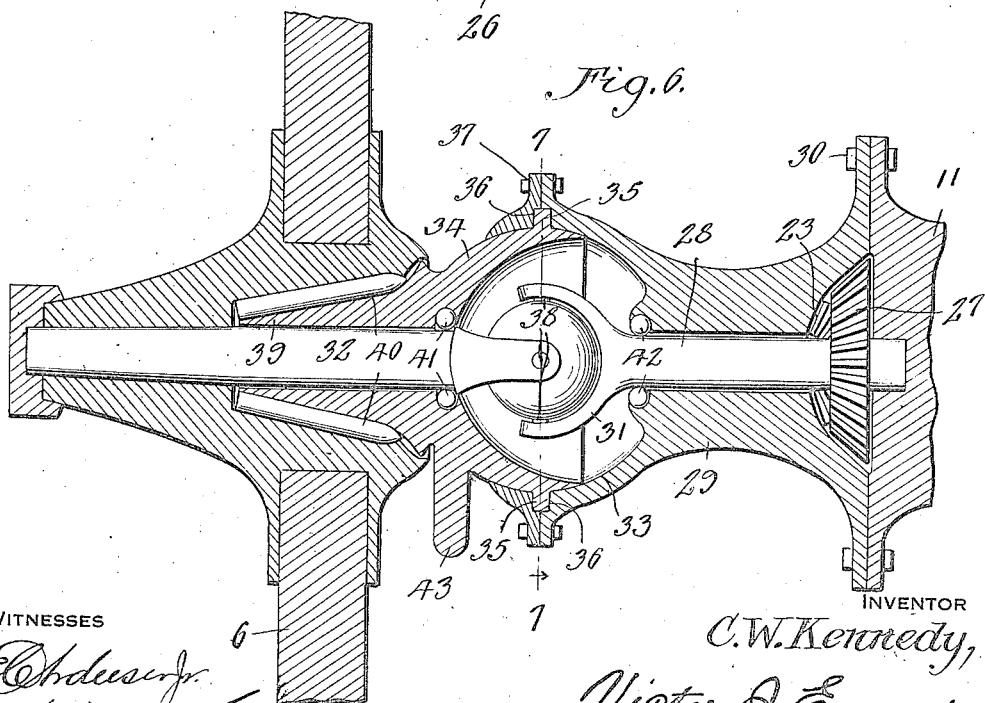
WITNESSES
INVENTOR
C. W. Kennedy,
BY Victor J. Evans
ATTORNEY

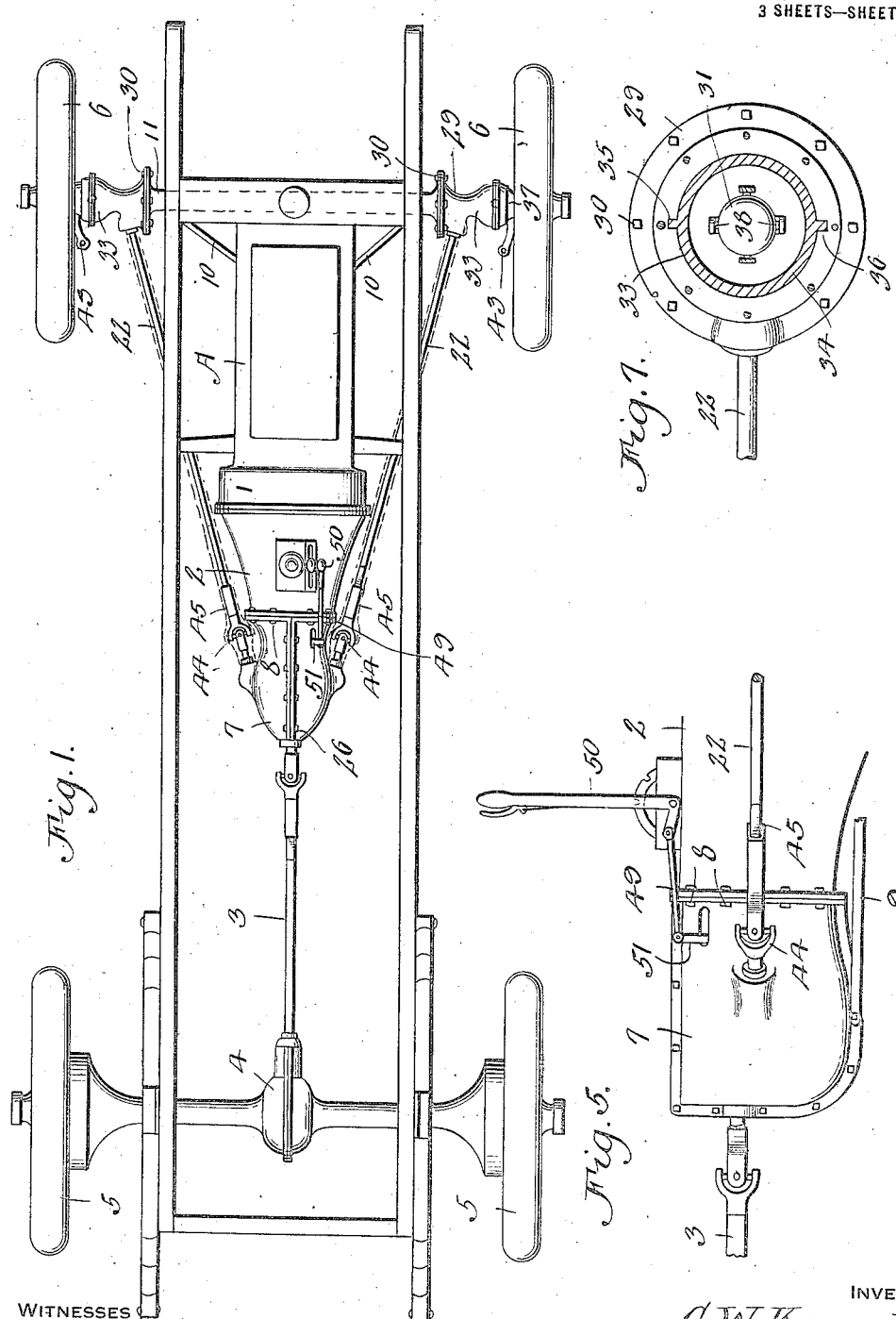

UNITED STATES PATENT OFFICE.

CHARLES WILLIAM KENNEDY, OF CLARENCE, MISSOURI, ASSIGNOR OF ONE-HALF TO WILBER JACKSON, OF MACON, MISSOURI.

FOUR-WHEEL DRIVE FOR AUTOMOBILES.

1,229,971.

Specification of Letters Patent.

Patented June 12, 1917.

Application filed December 19, 1916. Serial No. 137,843.

*To all whom it may concern:*

Be it known that I, CHARLES WILLIAM KENNEDY, a citizen of the United States, residing at Clarence, in the county of Shelby and State of Missouri, have invented new and useful Improvements in Four-Wheel Drives for Automobiles, of which the following is a specification.

This invention relates to four wheel drive mechanism for automobiles, the object in view being to provide simple and reliable means whereby the power of the driving shaft of an automobile or motor truck may be transmitted to the front wheels of the machine simultaneously with the transmission of power to the rear wheels thereof, enabling the power of the engine to be equally transmitted to all of the driving wheels of the vehicle.

With the above and other objects in view, the invention consists in the novel construction, combination and arrangement of parts, herein fully described, illustrated and claimed.

In the accompanying drawings:—

Figure 1 is a plan view of the chassis of a motor vehicle showing the general arrangement of the driving mechanism including that employed for imparting motion to the front or steering wheels of the machine.

Fig. 2 is an enlarged vertical transverse section taken in rear of the front differential gearing.

Fig. 5 is a fragmentary side elevation of the housings of the transmission gearing and forward differential gearing.

Fig. 6 is a vertical longitudinal section taken through the end portion of the front axle and also showing the adjacent wheel in section.

Fig. 7 is a section on the line 7—7 of Fig. 6.

Figure 3:
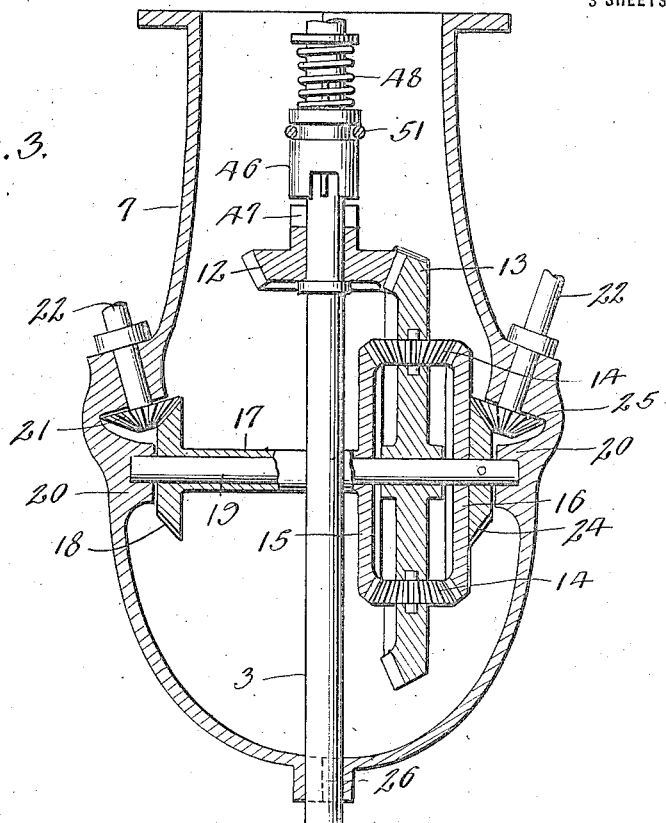
Fig. 3 is a horizontal section on the line 3—3 of Fig. 2.

Referring to the drawings A designates generally an internal combustion engine, 1 the fly-wheel housing, 2 the transmission housing, 3 the drive shaft or in other words the shaft which ordinarily extends from the transmission gearing to the rear axle where it is associated with the usual differential gearing contained in the housing 4. 5 designates the rear driving wheels of the machine and 6 the front wheels which under the present invention are used both as driving and steering wheels.

In carrying out the present invention, I employ a casing or housing 7 for what may be termed the front differential gearing, the casing 7 being fastened by means of bolts 8 or their equivalent directly to the rear end of the housing 2 containing the transmission gearing. If desired braces 9 may connect the housing 7 with the housing 2 or the fly-wheel housing 1 and other braces 10 may be interposed between the base of the engine and the front axle 11 of the vehicle.

Referring now to Fig. 2, the casing 7 is formed with bearings for the main drive shaft 3 which extends entirely through the casing 7 back to the rear axle. Fast on the shaft 3 within the casing 7 is a driving pinion 12, which meshes with and drives a master gear or ring gear 13 carrying planetary pinions 14 which mesh with gears 15 and 16 at opposite sides thereof. The gear 15 has a sleeve-like bearing 17 extending laterally therefrom and carrying a gear 18, the sleeve 17 being journaled upon a shaft 19 which is held in bearings 20 in the casing or housing 7. The gear 18 meshes with and drives a gear 21 fast on the end of an oblique shaft 22 which extends forwardly where it has fast thereon another gear 23 the purpose of which will hereinafter appear. The gear 16 is provided on its outer side with a second gear face 24 which meshes with and drives a gear 25 on another shaft 22 extending obliquely with relation to the shaft 3 and arranged at the opposite side of the housing 2 from the other shaft 22 hereinabove referred to. The housing 7 is preferably made in sections which are flanged and bolted together as indicated at 26, the casing being adapted to retain lubricant in which all of the gears therein rotate. Both of the shafts 22 have gears 23 fast on the divergent ends thereof.

Referring now to Fig. 6, each of the gears 23 meshes with a gear 27 fast on a short shaft 28 journaled in a bearing member 29 secured to the front axle 11 by bolts 30 or the equivalent thereof, the parts 11 and 29 being recessed to receive and contain the gears 23 and 27. The shaft 28 is connected by a universal joint 31 to a spindle 32 which carries the adjacent front wheel 6 of the ve hicle, said wheel being fast on the spindle 32 so as to be driven thereby. The bearing member 29 is enlarged to form a hollow ball shaped socket 33 in which is received a correspondingly shaped ball member 34 having pivots 35 which are received in sockets 36 in the member 33, the member 33 including a detachable section 37 bolted thereto to enable the members 33 and 34 to be associated and taken apart. The pivots 35 are in vertical alinement with each other and with the pivots 38 of the universal joint 31. The member 34 is provided with a conical or tapering portion 39 around which are disposed anti-friction rollers 40 contained within the hub of the wheel 6. Ball bearings 41 are interposed between the member 39 and the spindle 32, and other ball bearings 42 are interposed between the member 29 and the shaft 28. The wheel 6 thus revolves freely around the member 39 and the latter is adapted to turn on a substantially vertical axis by reason of the pivots 35 which turn in the sockets 36 of the member 33. The member 34 is provided with an arm 43 to which one of the steering rods or connections is attached for the purpose of turning the steering wheel 6. By reference to Fig. 1 it will be seen that the shafts 22 diverge forwardly from the housing 7 to the bearing members 29 where they are geared to the shafts 28, motion thus being transmitted to both of the front steering wheels 6 of the vehicle.

Figure 4:
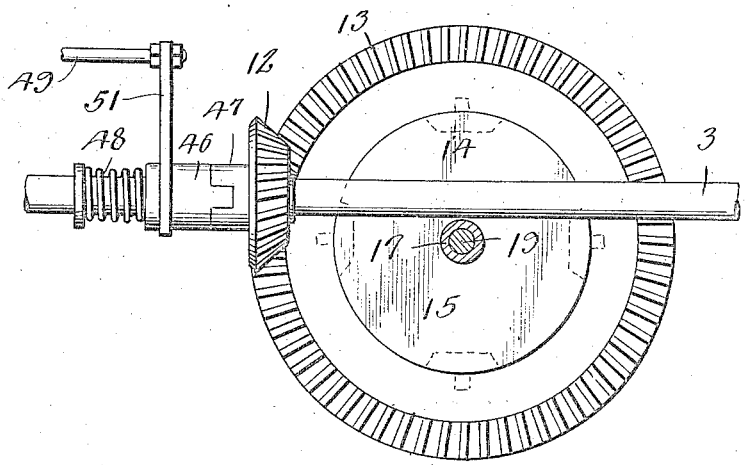
Fig. 4 is a fragmentary vertical longitudinal section on the line 4—4 of Fig. 2.

In order to provide for the up and down movement of the body of the vehicle in relation to the front axle, each of the shafts 22 is of sectional construction, certain sections thereof being connected by universal joints 44 and certain other sections being connected by a slip joint 45. The front wheel driving mechanism may be thrown out of operation when not needed by means of a clutch 46 slidably mounted on the drive shaft 3 as shown in Fig. 4 and adapted to engage or disengage a clutch face 47 on the driving pinion 12. The clutch 46 is normally pressed into engagement with the clutch face 47 by means of a spring 48 surrounding the shaft 3 and the clutch is manually operated by means of a rod 49 connected to a suitable hand lever 50, the rod 49 carrying a clutch shifting member or fork 51 which engages an annular groove in the clutch 46.

From the foregoing description taken in connection with the accompanying drawings it will now be seen that the power of the engine may be delivered to all four of the wheels of the vehicle and equally distributed to all of such wheels. This will greatly aid in hill climbing and to a great extent overcome difficulties encountered in driving a motor vehicle over muddy and soft roads, as the front wheels will prepare the roadway for the rear wheels by packing mud, snow and the like, thereby increasing the traction of the rear wheels. Furthermore there is not the same tendency of the front wheels to skid as power is being constantly delivered thereto and they therefore act as traction wheels, as well as the rear driving wheels. The vehicle will start more easily on account of there being practically twice the traction as compared with the ordinary rear wheel drive. Furthermore the wear and tear on the rear tires and wheels will be reduced, as the front wheels will bear their proportion of the wear and tear. This not only saves the tires but increases the life and durability of the vehicle as a whole, the strain on the driving connections being distributed between the front and rear wheels.

I claim:—

1. In a motor vehicle, the combination with a vehicle frame, and an engine mounted thereon, of transmission gearing located directly behind the engine, a drive shaft extending from said transmission gearing rearwardly to the rear differential gearing of the rear driving axle, front differential gearing located in close proximity to and in rear of the transmission gearing, a housing for the front differential gearing fastened directly to the housing of the transmission gearing, and front wheel driving shafts extending from the front differential gearing divergently toward the front wheels to which said shafts are geared, the front differential gearing being located at one side of the main drive shaft.

2. In a motor vehicle, the combination with a vehicle frame, and an engine mounted thereon, of transmission gearing located directly behind the engine, a drive shaft extending from said transmission gearing rearwardly to the rear differential gearing of the rear driving axle, front differential gearing located in close proximity to and in rear of the transmission gearing, a housing for the front differential gearing fastened directly to the housing of the transmission gearing, and front wheel driving shafts extending from the front differential gearing divergently toward the front wheels to which said shafts are geared, the front differential gearing being located at one side of the main drive shaft, and the front wheel driving shafts being geared to opposite members of the front differential gearing on opposite sides of said main driving shaft.

3. In a motor vehicle, the combination with a vehicle frame, and an engine mounted thereon, of transmission gearing located directly behind the engine, a drive shaft extending from said transmission gearing rearwardly to the rear differential gearing of the rear driving axle, front differential gearing located in close proximity to and in rear of the transmission gearing, a housing for the front differential gearing fastened directly to the housing of the transmission gearing, front wheel driving shafts extending from the front differential gearing divergently toward the front wheels to which said shafts are geared, the front differential gearing being located at one side of the main drive shaft, said front differential gearing embodying a master gear, a driving pinion meshing therewith, and a manually controlled clutch for connecting said pinion to and disconnecting the same from said main driving shaft.

In testimony whereof I affix my signature.

CHARLES WILLIAM KENNEDY.